(12) United States Patent
Watanabe

(10) Patent No.: US 12,498,696 B2
(45) Date of Patent: Dec. 16, 2025

(54) NUMERICAL CONTROLLER AND CONTROL METHOD TO CONTROL A MULTI-EDGE TOOL

(71) Applicant: FANUC CORPORATION, Yamanashi (JP)

(72) Inventor: Toshihiro Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 598 days.

(21) Appl. No.: 18/014,388

(22) PCT Filed: Jul. 12, 2021

(86) PCT No.: PCT/JP2021/026155
§ 371 (c)(1),
(2) Date: Jul. 13, 2023

(87) PCT Pub. No.: WO2022/014535
PCT Pub. Date: Jan. 20, 2022

(65) Prior Publication Data
US 2023/0393552 A1    Dec. 7, 2023

(30) Foreign Application Priority Data
Jul. 17, 2020   (JP) ................................ 2020-122609

(51) Int. Cl.
*G05B 19/4093* (2006.01)
*B23Q 15/12* (2006.01)

(52) U.S. Cl.
CPC ....... *G05B 19/40931* (2013.01); *B23Q 15/12* (2013.01)

(58) Field of Classification Search
CPC ........ G05B 19/40931; G05B 19/40938; G05B 19/182; G05B 19/19; B23Q 15/12; B23B 1/00
See application file for complete search history.

(56) References Cited

U.S. PATENT DOCUMENTS

2016/0246288 A1* 8/2016 Ogawa ................. G05B 19/404
2018/0059636 A1* 3/2018 Fukumoto .............. G05B 19/19
(Continued)

FOREIGN PATENT DOCUMENTS

| JP | 53-37989 | 4/1978 |
| JP | 54-20490 | 2/1979 |

(Continued)

OTHER PUBLICATIONS

International Search Report issued Oct. 5, 2021 in corresponding International Application No. PCT/JP2021/026155.

*Primary Examiner* — Alicia M. Choi
(74) *Attorney, Agent, or Firm* — WENDEROTH, LIND & PONACK, L.L.P.

(57) ABSTRACT

A numerical value control device controls a machine tool in which a multi-edge tool for turning is used to turn a workpiece, and said numerical value control device includes: an NC command decoder unit that decodes a command of a processing program; and a tool information generation unit that generates geometric information pertaining to the multi-edge tool. The NC command decoder unit includes: a tool path generation unit that calculates the tool path from the command of the processing program; an edge switching determination unit that determines whether or not the edge of the multi-edge tool needs to be switched; an edge switching path generation unit that calculates an edge switching path including a retracting path for switching the edge, the rotation direction and rotation amount of the multi-edge tool, and a returning path; and a tool path regeneration unit that binds the edge switching path to the tool path.

6 Claims, 14 Drawing Sheets

(56) References Cited

U.S. PATENT DOCUMENTS

2018/0364681 A1* 12/2018 Fujiyama ............... G05B 19/19
2023/0050486 A1*  2/2023 Sannomiya ........... B23B 27/065

FOREIGN PATENT DOCUMENTS

| | | | |
|---|---|---|---|
| JP | 61-178104 | 8/1986 | |
| JP | 62-54649 | 3/1987 | |
| JP | 7-314290 | 12/1995 | |
| JP | 2002-533223 | 10/2002 | |
| JP | 2007021692 A * | 2/2007 | |
| JP | 3141295 | 5/2008 | |
| JP | 2018-34254 | 3/2018 | |
| WO | WO-2016093300 A1 * | 6/2016 | ............... B23B 1/00 |

\* cited by examiner

| TOOL NUMBER | EDGE NUMBER | EDGE TYPE NUMBER (P) | REMAINING LIFE (NUMBER OF TIMES OF USE) | ... |
|---|---|---|---|---|
| 0101 | 1 | 11 | 8 | |
| | 2 | 13 | 18 | |
| | 3 | 11 | 12 | |
| 0102 | 1 | 11 | 51 | |
| | 2 | 12 | 65 | |
| | 3 | 11 | 57 | |
| | 4 | 13 | 55 | |
| ... | | | | |

FIG. 4
Gxx P101 Q110 U2.0 F0.1 S1000 T0101 E1 H2
N101 G00 X10.0
N102 G01 Z-10.0
N103 X14.0 Z-11.0
N104 Z-14.0
N105 X22.0 Z-17.0
N106 Z-20.0
N110 X28.0
FIG. 5
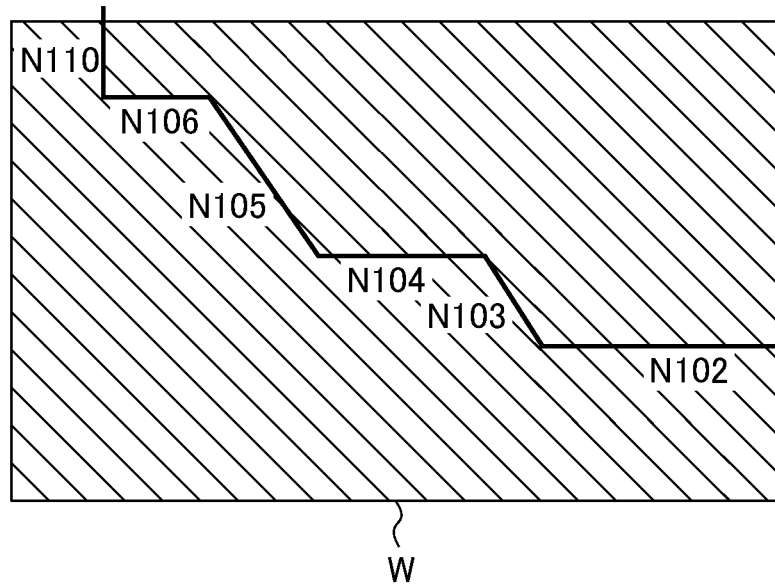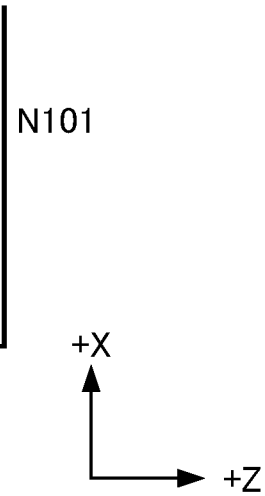

```
Gxx P101 Q110 U2.0 F0.1 S1000 T0101 E1
N99 U2.0 W4.0
A120.0 E1
U-2.0 W-4.0
N100 U2.0 W-4.0
A0.0 H2
U-2.0 W4.0
N101 G00 X10.0
N102 G01 Z-10.0
N103 X14.0 Z-11.0
N104 Z-14.0
N105 X22.0 Z-17.0
N106 Z-20.0
N110 X28.0
```

NUMERICAL CONTROLLER AND CONTROL METHOD TO CONTROL A MULTI-EDGE TOOL

TECHNICAL FIELD

The present invention relates to a numerical controller and a control method.

BACKGROUND ART

There is a multi-edge tool including a plurality of edges and capable of coping with workpieces of any shape by mounting cutting tools for different uses on each of the edges and changing an approach angle. A technique has been known in which a remaining life of each edge is calculated based on life data of each edge of a multi-edge tool and cumulative use time data when a machining task command is output, and when at least one edge exceeds the remaining life, the life of the multi-edge tool is determined to be expired. For example, see Patent Document 1.
Patent Document 1: Japanese Unexamined Patent Application, Publication No. H7-314290

DISCLOSURE OF THE INVENTION

Problems to be Solved by the Invention

By the way, when a series of machining is performed using different edges of one tool without exchange of the tool due to characteristics of a multi-edge tool, it may be necessary to switch from one edge to another edge of the multi-edge tool from the viewpoint of a shape of a workpiece and extension of tool life. In this case, there is a problem that a cycle time increases due to edge switching. Further, it is necessary to add a program for edge switching, which is troublesome for a worker.

Therefore, it is desirable to automatically perform the edge switching of the multi-edge tool.

Means for Solving the Problems

An aspect of the present disclosure is to provide a numerical controller that controls a machine tool for performing turning of a workpiece using a multi-edge tool for turning, the numerical controller including: an NC command decoding unit configured to decode a command of a machining program; a storage unit configured to retain tool information and edge information of the multi-edge tool; and a tool information generation unit configured to generate geometrical information of the multi-edge tool based on the tool information and the edge information retained in the storage unit, the NC command decoding unit including a tool path generation unit configured to calculate a tool path of the multi-edge tool from the command of the machining program, an edge switching determination unit configured to determine whether edge switching of the multi-edge tool is necessary, an edge switching path generation unit configured to, when the edge switching determination unit determines that the edge switching is necessary, calculate an edge switching path including a retract path for the edge switching, a rotation direction and a rotation amount of the multi-edge tool, and a return path along which the retract path is returned to the tool path, and a tool path regeneration unit configured to combine the edge switching path with the tool path.

An aspect of the present disclosure is to provide a control method for a machine tool to be implemented by a computer, the machine tool being for performing turning of a workpiece using a multi-edge tool for turning, the control method including: an NC command decoding step of decoding a command of a machining program; and a tool information generation step of generating geometrical information of the multi-edge tool based on tool information and edge information of the multi-edge tool retained in a storage unit, the NC command decoding step including a tool path generation step of calculating a tool path of the multi-edge tool from the command of the machining program, an edge switching determination step of determining whether edge switching of the multi-edge tool is necessary, an edge switching path generation step, when the edge switching is determined to be necessary, of calculating an edge switching path including a retract path for the edge switching, a rotation direction and a rotation amount of the multi-edge tool, and a return path along which the retract path is returned to the tool path, and a tool path regeneration step of combining the edge switching path with the tool path.

Effects of the Invention

According to the aspects, it is possible to automatically perform edge switching of a multi-edge tool.

BRIEF DESCRIPTION OF THE DRAWINGS

FIG. 2 is a diagram showing an example of tool information data;

FIG. 4 is a diagram showing an example of a machining program;

FIG. 5 is a diagram showing an example of a finished shape of a workpiece cut by the machining program;

FIG. 7 is a diagram showing an example of a machining program for the tool path shown in FIG. 6A;

FIG. 9 is a diagram showing an example of a machining program in which edge switching paths are designated in advance;

PREFERRED MODE FOR CARRYING OUT THE INVENTION

Embodiment

First, the present embodiment will be schematically described. In the present embodiment, a numerical controller decodes a command of a machining program, and calculates a tool path of a multi-edge tool based on the decoded command of the machining program. The numerical controller determines, based on the calculated tool path, whether edge switching of the multi-edge tool is necessary, and calculates an edge switching path including a retract path for edge switching when the edge switching is necessary, a rotation direction and a rotation amount of the multi-edge tool, and a return path along which the retract path is returned to the tool path. The numerical controller combines the calculated edge switching path with the tool path, and causes a machine tool to machine a workpiece on the bound tool path.

Thus, according to the present embodiment, it is possible to solve the problem of "automatically performing edge switching of the multi-edge tool".

The above is the outline of the present embodiment.

Next, a configuration of the present embodiment will be described in detail with reference to the drawings.

Figure 1:
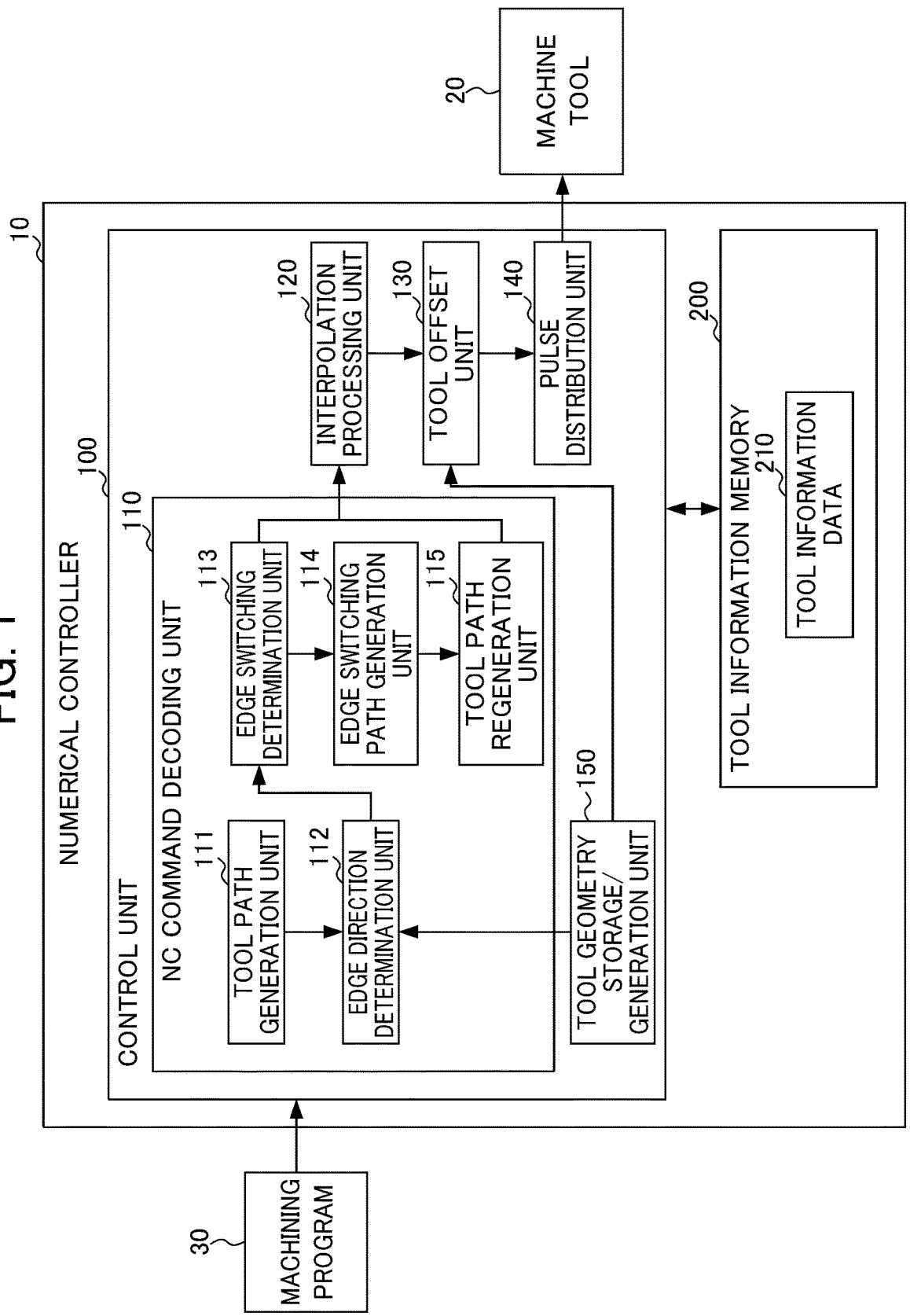
FIG. 1 is a functional block diagram showing a functional configuration example of a numerical controller according to an embodiment.

FIG. 1 is a functional block diagram showing a configuration example of a numerical controller according to the embodiment.

A numerical controller 10 and a machine tool 20 may be directly connected to each other via a connection interface (not shown). The numerical controller 10 and the machine tool may be connected to each other via a network such as an LAN (Local Area Network) or the Internet. In this case, the numerical controller 10 and the machine tool 20 include a communication unit (not shown) configured to perform mutual communication through such connection.

The machine tool 20 is, for example, a lathe for turning known to those skilled in the art, and operates based on an operation command from the numerical controller 10, which will be described below.

The numerical controller 10 is a numerical controller known to those skilled in the art, generates an operation command based on control information, and transmits the generated operation command to the machine tool 20. Thus, the numerical controller 10 controls the operation of the machine tool 20.

As shown in FIG. 1, the numerical controller 10 includes a control unit 100 and a tool information memory 200. Furthermore, the control unit 100 includes an NC command decoding unit 110, an interpolation processing unit 120, a tool offset unit 130, a pulse distribution unit 140, and a tool geometry storage/generation unit 150. Further, the NC command decoding unit 110 includes a tool path generation unit 111, an edge direction determination unit 112, an edge switching determination unit 113, an edge switching path generation unit 114, and a tool path regeneration unit 115.

<Tool Information Memory 200>

The tool information memory 200 is a storage unit such as SSD (Solid State Drive) or HDD (Hard Disk Drive). The tool information memory 200 stores tool information data 210.

The tool information data 210 includes, for example, tool information and edge information regarding a multi-edge tool selectable for the machine tool 20. Further, the tool information data 210 secures a zone capable of storing information for each edge by registering edge numbers corresponding to the number of edges for each multi-edge tool. Then, in the tool information data 210, the same edge type number is assigned to all edges having the same edge attributes (machining use, material, and tool nose radius compensation amount, for example), and is registered for each edge.

FIG. 2 is a diagram showing an example of the tool information data 210.

As shown in FIG. 2, the tool information data 210 includes a storage zone for storing a tool number assigned to each multi-edge tool to be registered, an edge number assigned to each edge for each multi-edge tool, an edge type number indicating a type of each edge, and a remaining life (the number of times of use).

The tool information data 210 may include a storage zone for storing a tool offset amount for each multi-edge tool (for example, a turning tool) and a tool nose radius compensation amount.

The tool information data 210 may store tool numbers, for example, "0101" and "0102" assigned to respective multi-edge tools to be registered, as described above.

Further, the tool information data 210 stores edge numbers "1" to "3" assigned to the multi-edge tool with the tool number "0101". This indicates that the multi-edge tool with the tool number "0101" has three edges. On the other hand, the tool information data 210 stores edge numbers "1" to "4" assigned to the multi-edge tool with the tool number "0102". This indicates that the multi-edge tool with the tool number "0102" has four edges.

Figure 3A:
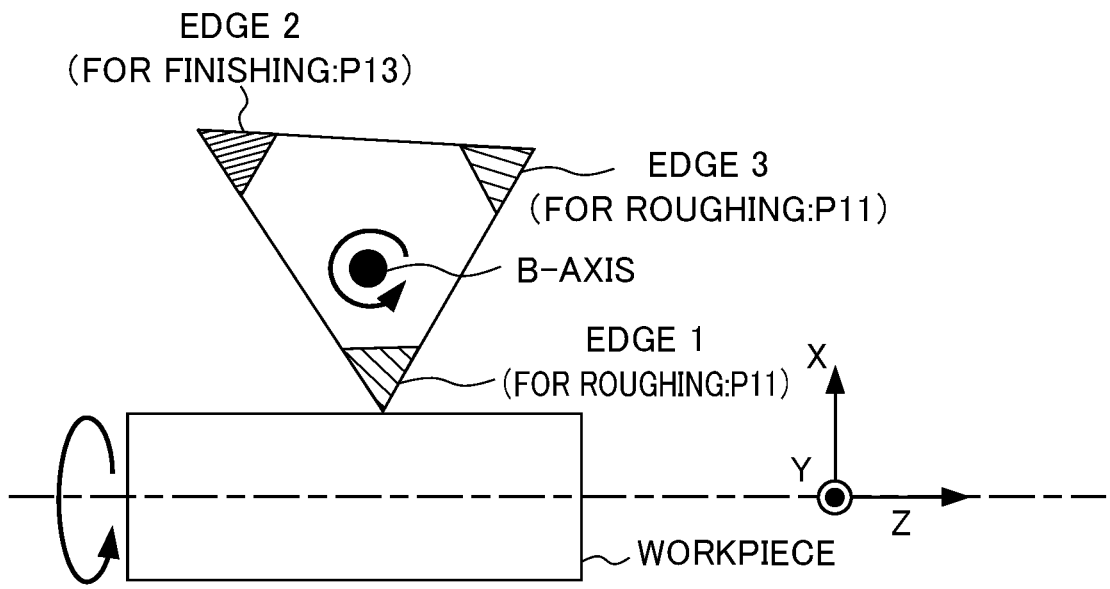
FIG. 3A is a diagram showing an example of a multi-edge tool.
Figure 3B:
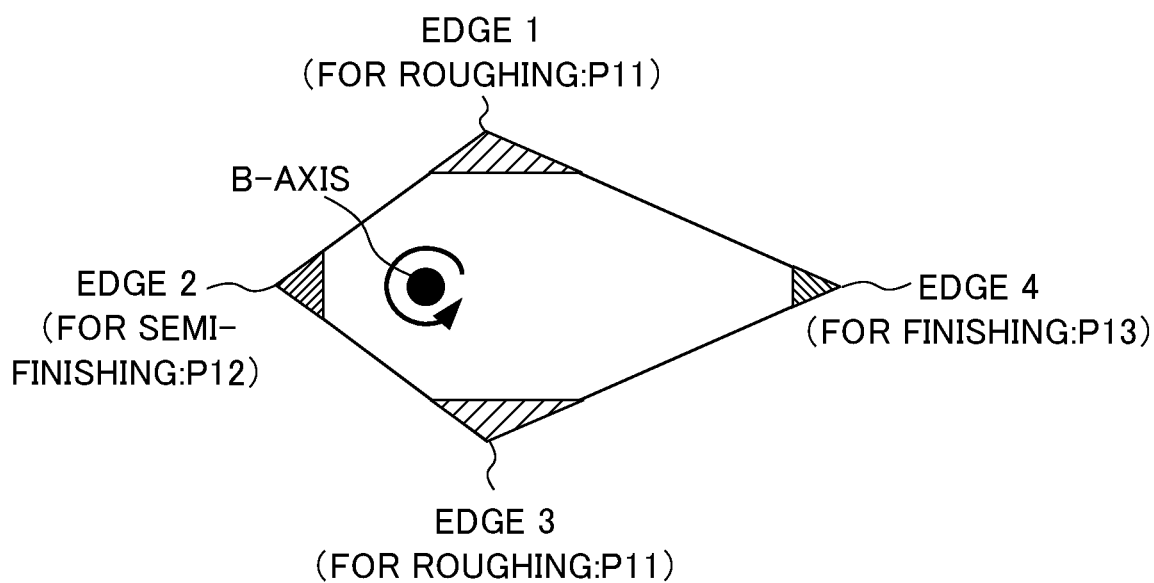
FIG. 3B is a diagram showing an example of a multi-edge tool.

FIGS. 3A and 3B are diagrams showing examples of multi-edge tools.

FIG. 3A shows a multi-edge tool with a tool number "0101". The multi-edge tool with the tool number "0101" has an edge for roughing at edge number "1", an edge for finishing at edge number "2", and an edge for roughing at edge number "3". Thus, the multi-edge tool can continuously perform roughing and finishing by rotating around a B-axis (a Y-axis). Then, in the tool information data 210, edge type numbers "11", "13", and "11" are stored in advance for edge numbers "1" to "3", respectively.

FIG. 3B shows a multi-edge tool with a tool number "0102". The multi-edge tool with the tool number "0102" has an edge for roughing at edge number "1", an edge for semi-finishing at edge number "2", an edge for roughing at edge number "3", and an edge for finishing at edge number "4". Thus, the multi-edge tool can continuously perform roughing, semi-finishing, and finishing by rotating around the B-axis (the Y-axis). Then, in the tool information data 210, edge type numbers "11", "12", "11", and "13" are stored in advance for edge numbers "1" to "4", respectively.

Further, the tool information data 210 also stores a remaining life (the number of times of use) for each edge of the multi-edge tool. For example, for the remaining life (the number of times of use) of the tool information data 210, the maximum number of times of use is set for each edge or each tool as an initial value when a new tool is replaced, and is counted minus by 1 each time the tool is used.

The life (the number of times of use) may be counted plus by 1 to 0. In this case, the numerical controller 10 may determine whether the life (the number of times of use) has reached the maximum number of times of use, and thus may determine whether the life has expired. Alternatively, the life (the number of times of use) may be a cumulative use time or a cutting distance for each edge of the multi-edge tool. In this case, the numerical controller 10 may determine whether the cumulative use time for edge of the multi-edge tool has reached a predetermined time, or whether the cutting distance has reached a predetermined distance, and thus may determine whether the life has expired.

<Control Unit 100>

The control unit 100 includes, for example, a CPU, a ROM, a RAM, and a CMOS memory which are configured to communicate with each other via a bus, as known to those skilled in the art.

The CPU is a processor that controls the numerical controller 10 as a whole. The CPU reads, via the bus, a system program and an application program stored in the ROM, and controls the numerical controller 10 as a whole according to the system program and the application program. Thus, as shown in FIG. 1, the control unit 100 is configured to realize functions of the NC command decoding unit 110, the interpolation processing unit 120, the tool offset unit 130, the pulse distribution unit 140, the tool geometry storage/generation unit 150, the tool path generation unit 111, the edge direction determination unit 112, the edge switching determination unit 113, the edge switching path generation unit 114, and the tool path regeneration unit 115. The RAM stores various data, for example, temporary calculation data and display data. The CMOS memory is backed up by a battery (not shown) and is configured as a nonvolatile memory that retains a memory state even when the numerical controller 10 is powered off.

<NC Command Decoding Unit 110>

The NC command decoding unit 110 acquires a machining program 30 generated by an external device such as a CAD/CAM device, and analyzes the acquired machining program 30.

FIG. 4 is a diagram showing an example of the machining program 30.

FIG. 5 is a diagram showing an example of a finished shape of a workpiece W cut by the machining program 30. A solid line in FIG. 5 indicates the finished shape of the workpiece W cut by the machining program, and a part of the workpiece W on a right side of the solid line is cut. Further, "N101" to "N110" indicate sequence numbers of 8th to 14th blocks in the machining program 30 in FIG. 4, and indicate corresponding parts of the finished shape indicated by the solid line.

As shown in FIG. 4, the machining program 30 is a program having 14 blocks. Here, "Gxx" in a first block of the machining program 30 is a simplified program command, and is a main program for cutting the workpiece W into the finished shape indicated by the solid line in FIG. 5.

Argument "P101" of "Gxx" indicates a sequence number of a first block that determines the finished shape. Further, argument "Q110" of "Gxx" indicates a sequence number of a last block that determines the finished shape. In addition, argument "U2.0" of "Gxx" indicates the amount of cutting of the tool. Further, argument "F0.1" of "Gxx" indicates a feed rate of the tool. Further, argument "S1000" of "Gxx" indicates a spindle speed per minute. Further, argument "T1010" of "Gxx" indicates a tool number. In addition, argument "E1" of "Gxx" indicates an edge number for a forward path which will be described below. Further, argument "H2" of "Gxx" indicates an edge number for a return path which will be described below.

<Tool Path Generation Unit 111>

The tool path generation unit 111 pre-reads a plurality of blocks included in the machining program 30, and calculates tool paths of the multi-edge tool from NC commands in the plurality of pre-read blocks.

Specifically, the tool path generation unit 111 calculates a path of the finished shape indicated by the solid line in FIG. 5 from the NC command of each of the plurality of blocks of the machining program 30, for example. However, since the amount of cutting of the multi-edge tool is limited, it is not possible to cut along the finished shape indicated by the solid line in FIG. 5 from the beginning. Therefore, the tool path generation unit 111 calculates the tool path, which allows the multi-edge tool to cut within the amount of cutting, based on the NC command of each of the plurality of blocks of the machining program 30.

Figure 6A:
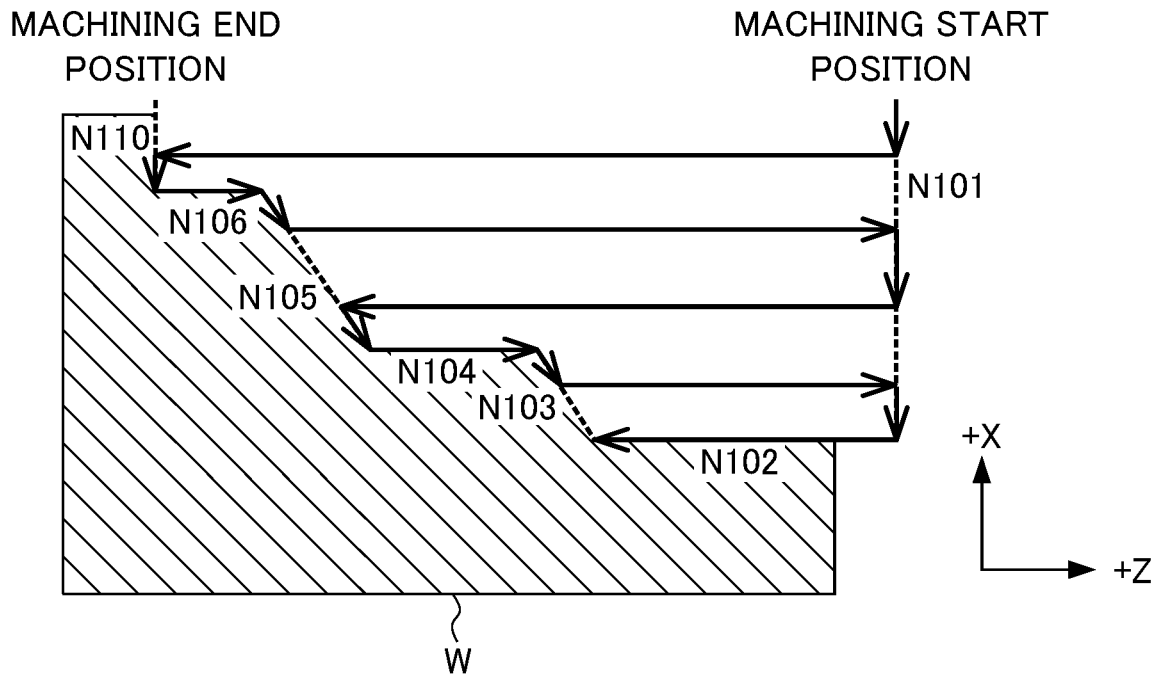
FIG. 6A is a diagram showing an example of a tool path calculated by a tool path generation unit.
Figure 6B:
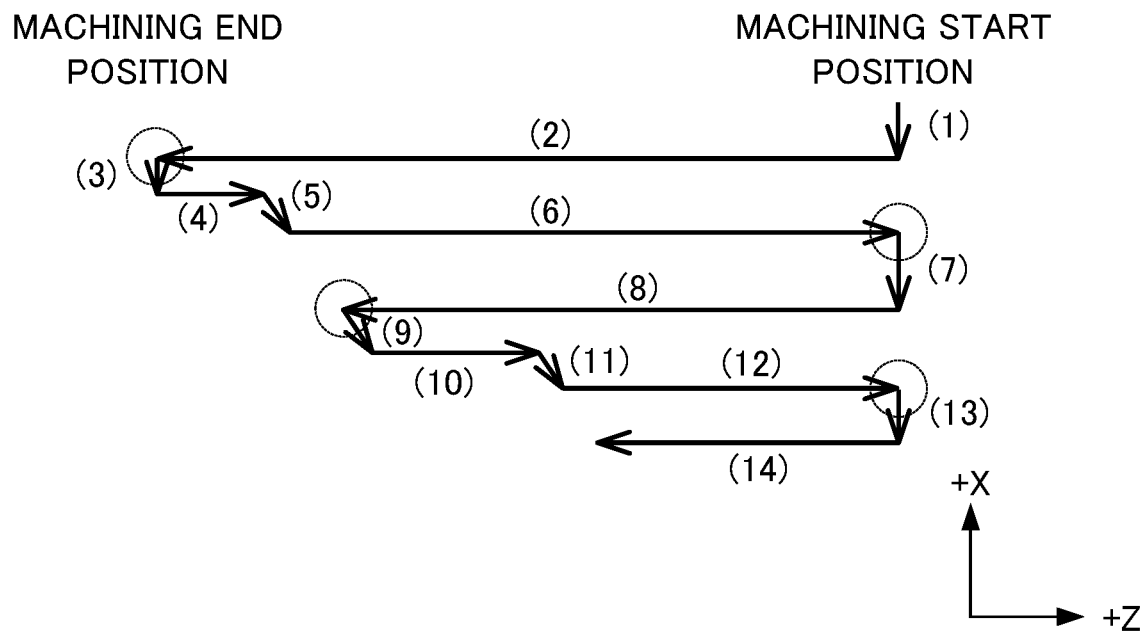
FIG. 6B is a diagram showing an example in which the tool path in FIG. 6A is numbered.

FIG. 6A is a diagram showing an example of a tool path calculated by the tool path generation unit 111. FIG. 6B is a diagram showing an example in which the tool path in FIG. 6A is numbered.

As shown in FIGS. 6A and 6B, the tool path generation unit 111 calculates the tool path on which the tool reciprocates in a Z-axis direction in the order of numbers (1) to (14) to cut the workpiece W with the amount of cutting set in −X-axis direction.

Figure 7:
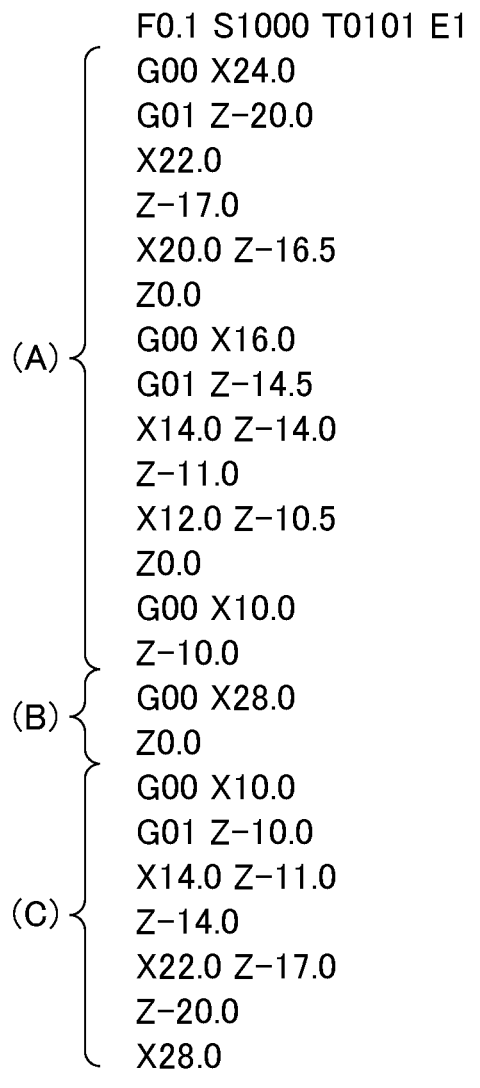

FIG. 7 is a diagram showing an example of the machining program for the tool path shown in FIG. 6A. In other words, the machining program 30 shown in FIG. 4 is a simplified version of the machining program shown in FIG. 7.

In a block included in (A) of the machining program in FIG. 7, the multi-edge tool cuts the workpiece W along the tool paths of the numbers (1) to (14) shown in FIG. 6B. Next, in a block included in (B), the multi-edge tool is returned to a machining start position to perform finishing. Then, in a block included in (C), the multi-edge tool performs finishing along the tool path indicated by the solid line in FIG. 5.

Cutting along the tool paths of the numbers (1) to (14) in the block of (A) is not limited to one time, and may be performed two or more times.

In the following description, the direction in which the multi-edge tool moves along the workpiece W (the Z-axis direction in FIG. 6A) is also referred to as a "reciprocating axis". Further, the direction when viewed from a machining start position to a machining end position based on the reciprocating axis (the −Z-axis direction in FIGS. 6A and 6B) is also referred to as a "forward path direction". Further, the direction when viewed from the machining end position to the machining start position based on the reciprocating axis (the +Z-axis direction in FIGS. 6A and 6B) is also referred to as a "return path direction".

<Edge Direction Determination Unit 112>

The edge direction determination unit 112 calculates an edge indexing angle at which the multi-edge tool and the workpiece W do not interfere with each other, based on the tool path calculated by the tool path generation unit 111 and geometrical information of the multi-edge tool acquired by the tool geometry storage/generation unit 150 which will be described below.

<Edge Switching Determination Unit 113>

The edge switching determination unit 113 determines, based on specified conditions, whether the edge switching of the multi-edge tool is necessary.

Specifically, for example, as in the machining program shown in FIG. 4, when the edge for the forward path and the edge for the return path are designated by the edge numbers, the edge switching determination unit 113 determines, based on the tool path calculated by the tool path generation unit 111 and shown in FIG. 6B, whether the edge switching of the multi-edge tool is necessary.

Specifically, the edge switching determination unit 113 determines, based on the tool path in FIG. 6B, whether three conditions are satisfied which are condition (a): a coordinate value of the reciprocating axis moves in the forward path direction or the return path direction on the tool path of the number (N), condition (b): a coordinate value of the reciprocating axis moves in a direction in which the coordinate value does not change on tool paths of numbers (N+1) to (N+M), and condition (c): a coordinate value of the reciprocating axis moves from the forward path direction to the return path direction or from the return path direction to the forward path direction on a tool path of a number (N+M+1). Note that N is a natural number of 1 or more, and M is a natural number of 0 or more. Further, when M is "0", the condition (b) is not considered.

The edge switching determination unit 113 can determine that the edge switching of the multi-edge tool is necessary, for example, in the case where three conditions (a) to (c) are satisfied when the edge for the forward path and the edge for the return path are designated by the edge numbers, that is, in the case where the edge switching determination unit 113 determines to be the movement from the forward path direction to the return path direction or from the return path direction to the forward path direction.

Referring to FIG. 6B, in the case of the tool paths of the number (1) to (14) shown in FIG. 6B, the edge switching determination unit 113 determines that the edge switching of the multi-edge tool is necessary, during switching from the tool path of the number (2) to the tool path of the number (3), from the tool path of the number (6) to the tool path of the number (7), from the tool path of the number (8) to the tool path of the number (9), and from the tool path of the number (12) to the tool path of the number (13), as indicated by dashed circles. From the tool path of the number (2) to the tool path of the number (3) and from the tool path of the number (8) to the tool path of the number (9), switching is performed from the forward path direction to the return path direction. Further, from the tool path of the number (6) to the tool path of the number (7) and from the tool path of the number (12) to the tool path of the number (13), switching is performed from the return path direction to the forward path direction.

Thus, for example, it is possible to make the cutting load constant at each edge of the multi-edge tool on the forward path and the return path, or to make the cutting distance uniform between the edges of the multi-edge tool.

The edge switching determination unit 113 determines whether the edge switching of the multi-edge tool is necessary, for example, based on the tool path and conditions (a) to (c) when the edge for the forward path and the edge for the return path are designated by the edge numbers, but the conditions to be designated are not limited thereto.

Examples of the conditions to be designated may include a case of designating an input signal or a physical quantity of a drive axis or shaft (for example, a speed or a torque). In this case, the edge switching determination unit 113 may determine, based on the designated condition (input signal or physical quantity of the drive axis), whether edge switching of the multi-edge tool is necessary.

Figure 6C:
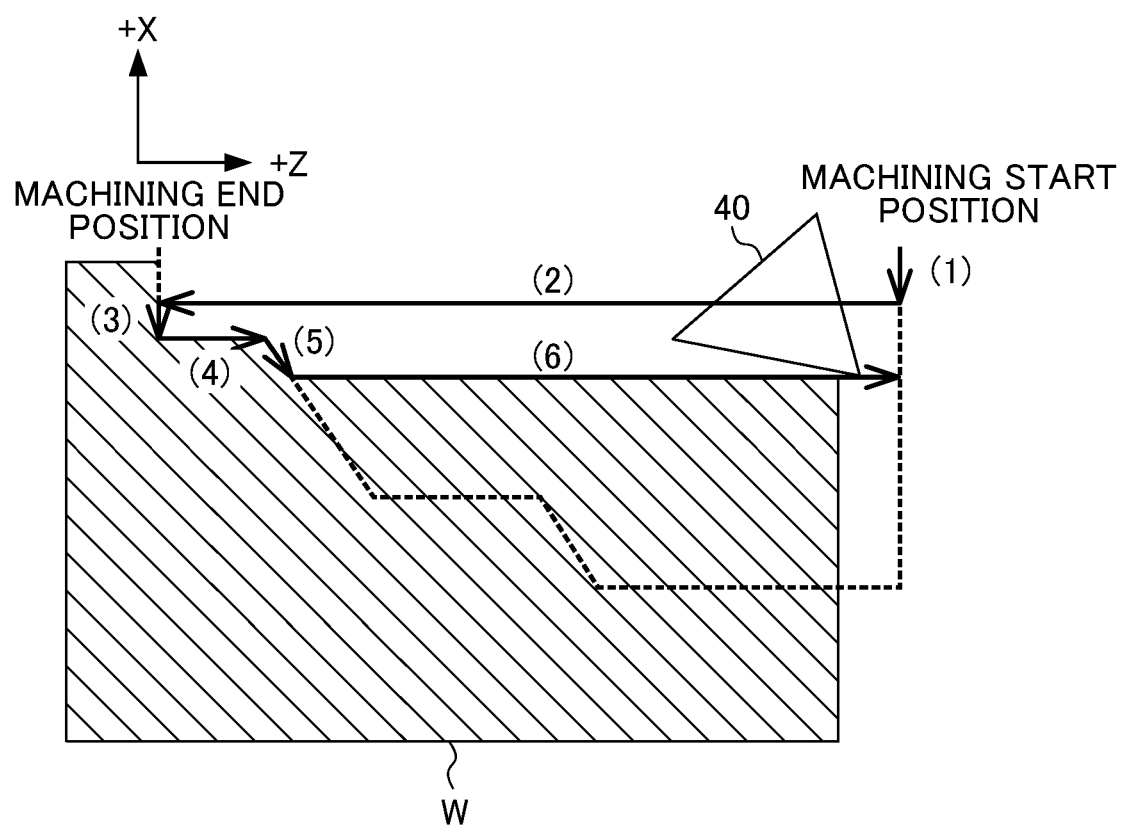
FIG. 6C is a diagram showing an example of determining edge switching based on an input signal and a physical quantity of a drive axis.

FIG. 6C is a diagram showing an example of determining edge switching based on the input signal or the physical quantity of the drive axis. As shown in FIG. 6C, for example, edge switching can be determined to be possible by detection that the multi-edge tool 40 comes near an end point of the tool path of the number (6) and a load in the Z-axis direction becomes smaller than a specific threshold value. Further, a signal can be input and edge switching can be determined to be possible by detection an X-axis and a Z-axis come to a predetermined position.

For example, as a condition to be designated, a case may be designated where the load in the Z-axis direction becomes smaller than the predetermined value set in advance. In this case, the edge switching determination unit 113 may determine that the edge switching is possible when it is determined that the load in the Z-axis direction becomes smaller than the predetermined value set in advance. Alternatively, as a condition to be designated, for example, a case may be designated where the positions in the X-axis and/or the Z-axis of the multi-edge tool 40 come to preset positions. In this case, the edge switching determination unit 113 may determine to perform edge switching, for example, based on the input signal indicating that the positions in the X-axis and/or the Z-axis of the multi-edge tool 40 come to the preset positions.

Further, as a condition to be designated, an intermediate point in the entire tool path may be designated. In this case, when the entire tool path is the path of the numbers (1) to (14) shown in FIG. 6B, the edge switching determination unit 113 determines the intermediate point, and may determine to perform edge switching.

Thus, it is possible to perform edge switching at an arbitrary timing that the user considers to be suitable for cutting.

When the edge switching determination unit 113 determines that the edge switching of the multi-edge tool is not necessary, the control unit 100 controls the tool path calculated by the tool path generation unit 111 to cut along the path interpolated by the interpolation processing unit 120.

<Edge Switching Path Generation Unit 114>

The edge switching path generation unit 114 calculates, based on the designated conditions, an edge switching path including a retract path for edge switching when the edge switching determination unit 113 determines that the edge switching is necessary, a rotation direction and a rotation amount of the multi-edge tool, and a return path along which the retract path is returned to the tool path.

FIGS. 8A to 8D are diagrams showing examples of a retract path, a rotation direction and a rotation amount of the multi-edge tool, and a return path.

Figure 8A:
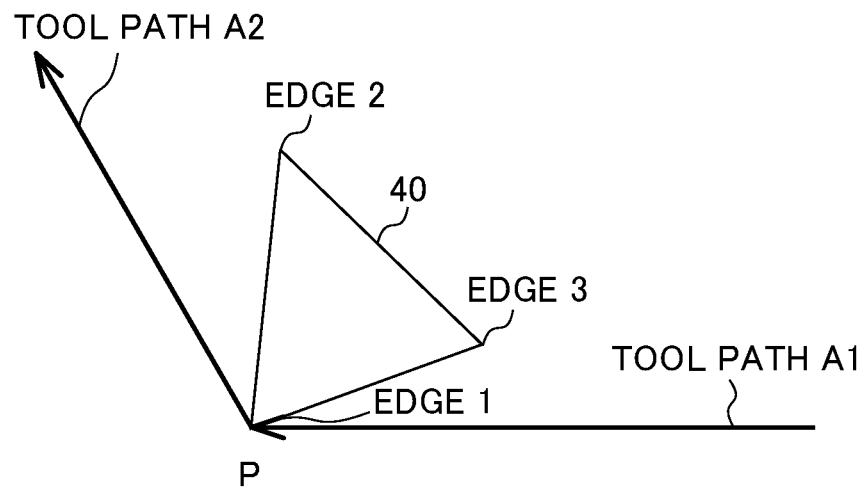
FIG. 8A is a diagram showing examples of a retract path, a rotation direction and a rotation amount of the multi-edge tool, and a return path.
Figure 8B:
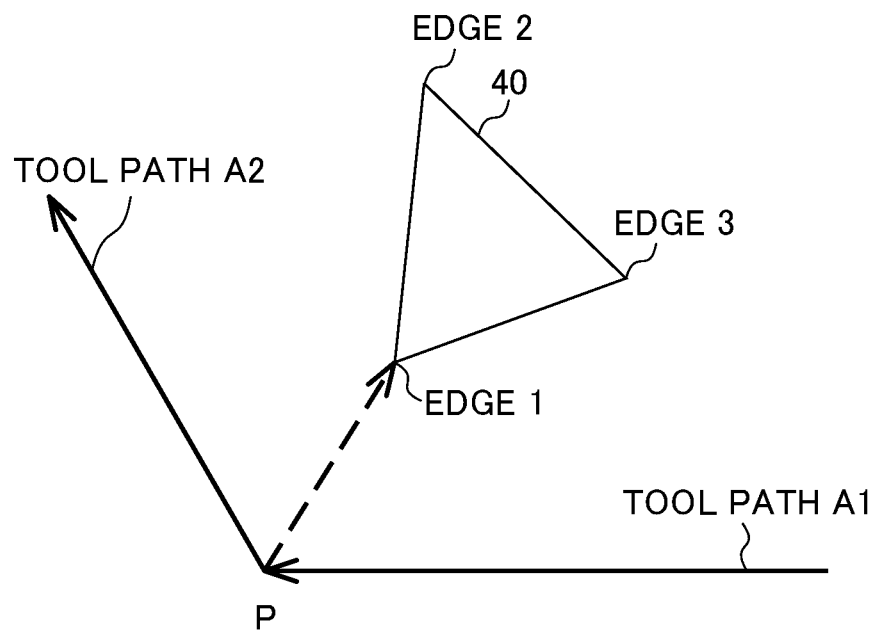
FIG. 8B is a diagram showing examples of a retract path, a rotation direction and a rotation amount of the multi-edge tool, and a return path.

Specifically, as shown in FIG. 8A, for example, when the edge switching determination unit 113 determines that edge switching is necessary in a point P at which switching occurs from a tool path A1 to a tool path A2 of the multi-edge tool 40 generated by the tool path generation unit 111, the edge switching path generation unit 114 determines, as a retract direction (escape direction), a direction (for example, a normal direction of the tool path, or a direction of a bisector between tool paths) indicated by a broken line based on the tool path A1 and the tool path A2, as shown in FIG. 8B. For example, when the multi-edge tool 40 switches from the edge 1 for roughing to the edge 3 for roughing of the tool number "0101" shown in FIG. 3A, the edge switching path generation unit 114 sets a retract amount (escape amount) that interference between the workpiece W and the edge does not occur when the multi-edge tool 40 rotates, using a method known to those skilled in the art.

Figure 8C:
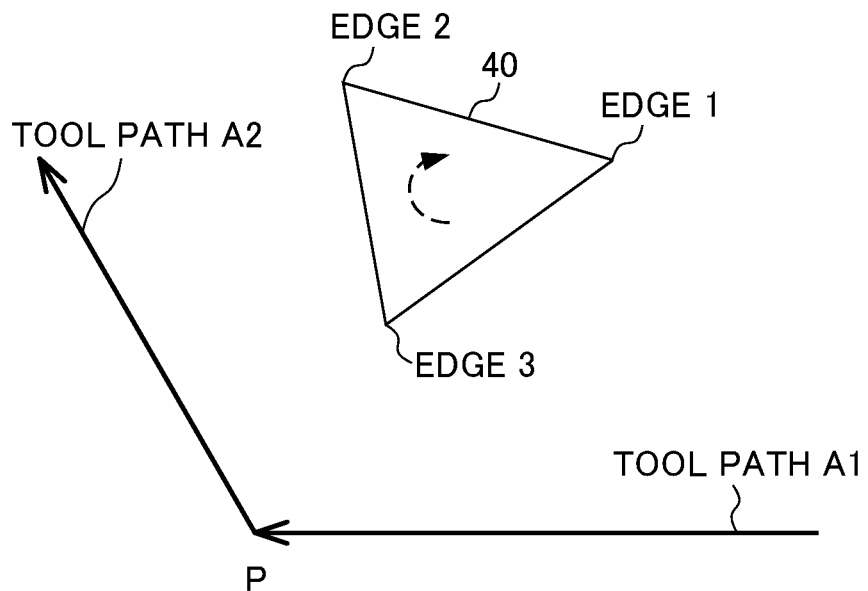
FIG. 8C is a diagram showing examples of a retract path, a rotation direction and a rotation amount of the multi-edge tool, and a return path.
Figure 8D:
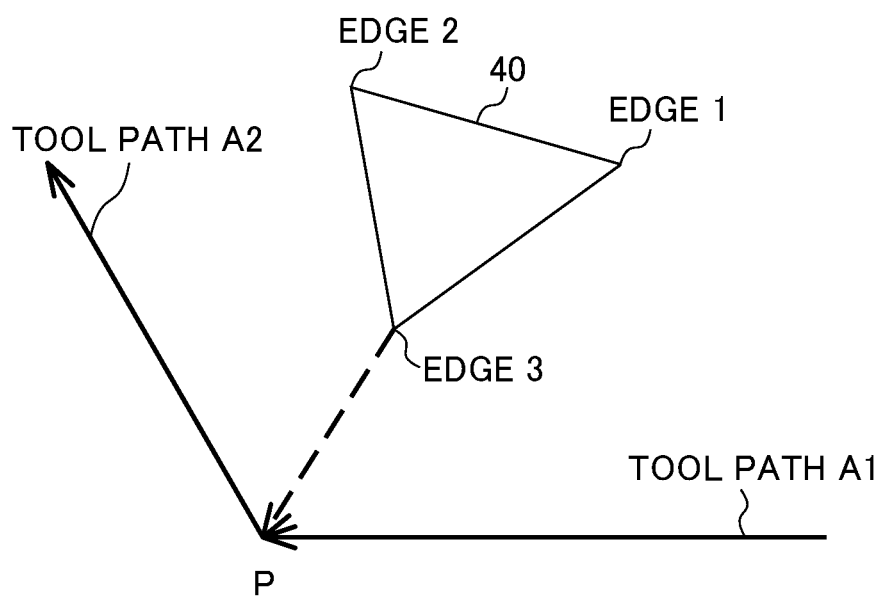
FIG. 8D is a diagram showing examples of a retract path, a rotation direction and a rotation amount of the multi-edge tool, and a return path.

Next, as shown in FIG. 8C, the edge switching path generation unit 114 sets the rotation direction and the rotation amount from the edge 1 to the edge 3 of the multi-edge tool 40 using a method known to those skilled in the art. Specifically, the edge switching path generation unit 114 sets the rotation direction clockwise such that the rotation amount from the edge 1 to the edge 3 of the multi-edge tool 40 is minimized (hereinafter, also referred to as "shortcut"). Then, as shown in FIG. 8D, the edge switching path generation unit 114 sets the return path as a reverse operation of the retract path (escape operation).

The edge switching path generation unit 114 sets the rotation direction and the rotation amount from the edge 1 to the edge 3 of the multi-edge tool 40 so as to be the shortcut, but is not limited thereto.

Figure 8E:
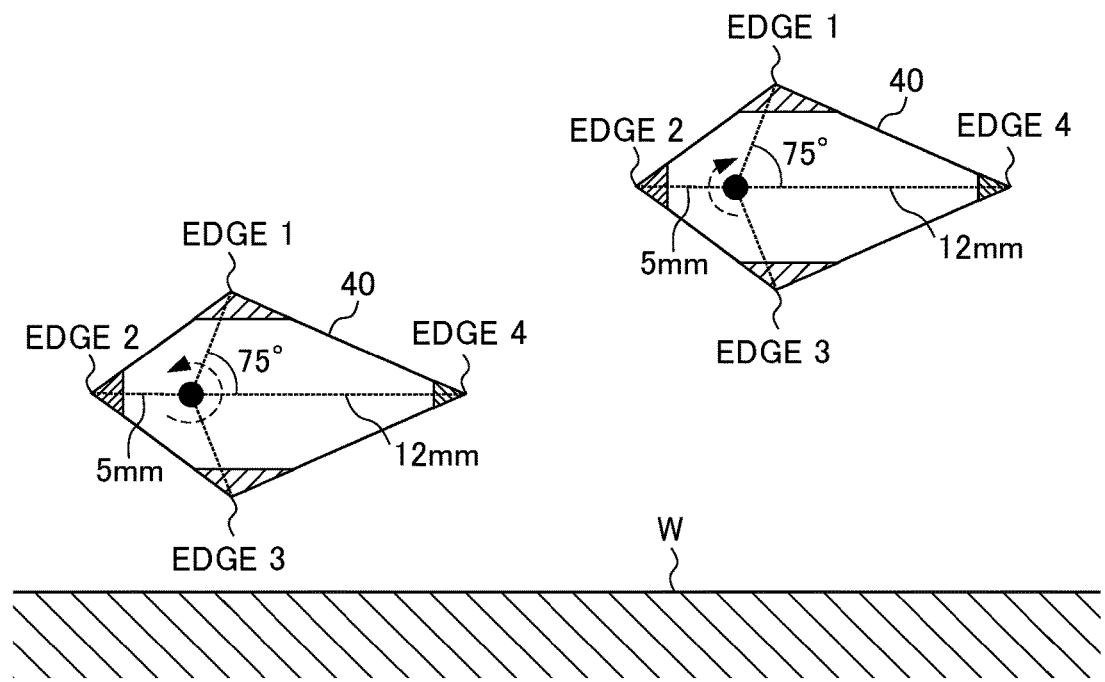
FIG. 8E is a diagram showing an example of a case where a retract amount (escape amount) during a detour differs from that during a shortcut.

For example, when the multi-edge tool 40 is the tool number "0102" shown in FIG. 3B and switches from the edge 3 for roughing to the edge 1 for roughing, a distance (for example, 12 mm) between the edge 4 and the B-axis is longer than a distance (for example, 5 mm) between the edge 2 and the B-axis as shown in FIG. 8E. In this case, the edge switching path generation unit 114 may set a detour with a large rotation amount (for example, 210 degrees) rotating from the edge 3 to the edge 1 via the edge 2 rather than the shortcut with a small rotation amount (for example, 150 degrees) rotating from the edge 3 to the edge 1 via the edge 4. This takes a long time to perform the edge switching because the retract amount (escape amount) (for example, 12 mm+α) equal to or more than the distance between the edge 4 and the B-axis during the shortcut in the multi-edge tool 40 shown in FIG. 3B is set to be longer than the retract amount (escape amount) (for example, 5 mm+α) during the detour. Therefore, the edge switching path generation unit 114 may select the detour with a short retract amount (escape amount). Here, α represents a length greater than 0 mm.

Further, the edge switching path generation unit 114 calculates the edge switching path from the tool path, but is not limited thereto. For example, the edge switching path may be designated in the machining program 30 in advance.

FIG. 9 is a diagram showing an example of the machining program 30 in which edge switching paths are designated in advance.

As shown in FIG. 9, second to fourth blocks show an edge switching operation from the forward path direction to the return path direction, and fifth to seventh blocks show an edge switching operation from the return path direction to the forward path direction.

<Tool Path Regeneration Unit 115>

The tool path regeneration unit 115 combines the tool paths calculated by the tool path generation unit 111 with the edge switching paths calculated by the edge switching path generation unit 114.

Specifically, for example, in the case of FIGS. 8A to 8D, the tool path regeneration unit 115 combines, in the point P at which the tool path A1 is switched to the tool path A2, the edge switching paths, which are calculated by the edge switching path generation unit 114, including the retract direction, the retract amount, the rotation direction, the rotation amount, and the return path of the multi-edge tool 40. Then, the tool path regeneration unit 115 outputs the tool paths, with which the edge switching paths are combined, to the interpolation processing unit 120.

Figure 10A:
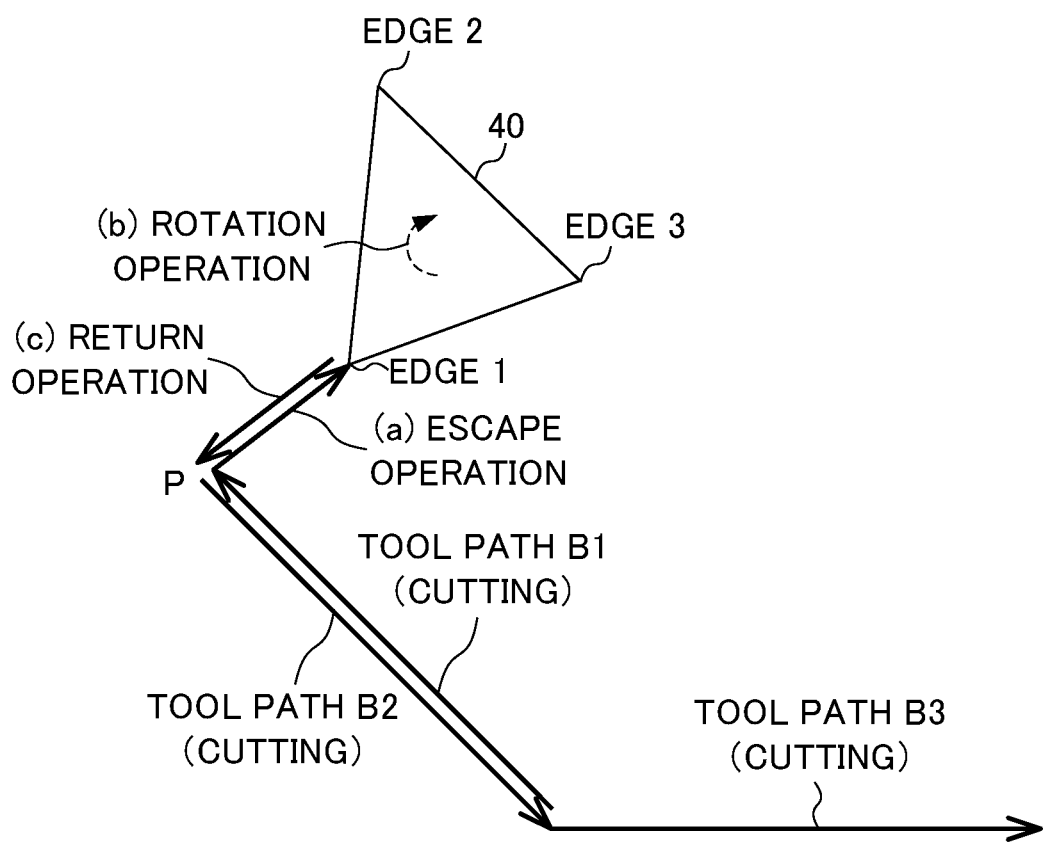
FIG. 10A is a diagram showing an example illustrating an operation of a tool path regeneration unit.

FIG. 10A is a diagram showing an example illustrating an operation of the tool path regeneration unit 115.

As shown in FIG. 10A, for example, tool paths B1 to B3 are calculated by the tool path generation unit 111, and the tool paths B1 to B3 are paths along which the multi-edge tool cuts the workpiece W in order.

In this case, as described above, for example, when the edge switching determination unit 113 determines that edge switching is necessary at a point P at which the tool path B1 is switched to tool path B2, the edge switching path generation unit 114 calculates edge switching paths including a retract direction, a retract amount, a rotation direction, a rotation amount, and a return path of the multi-edge tool 40 from an end point (point P) of the tool path B1, as in the case of FIGS. 8A to 8D.

Then, as shown in FIG. 10A, the tool path regeneration unit 115 connects edge switching paths of (a) retract operation (escape operation), (b) rotation operation, and (c) return operation between the tool path B1 and the tool path B2.

When an operation next to the return operation of the multi-edge tool 40 is an operation (for example, fast forwarding) that does not involve cutting, the tool path regeneration unit 115 may cause an end point of the retract operation (escape operation) or the return operation to overlap with an end point of the next operation.

Figure 10B:
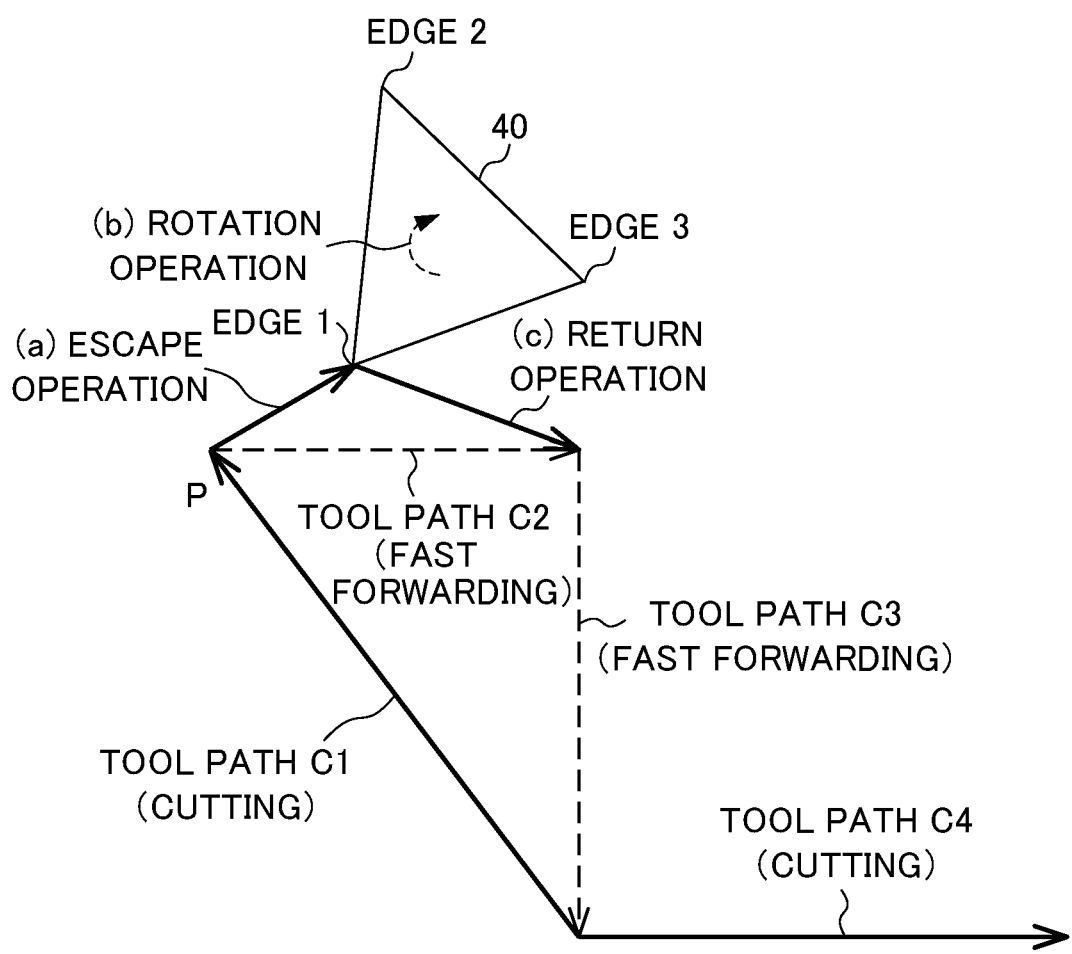
FIG. 10B is a diagram showing an example illustrating an operation of the tool path regeneration unit when an operation next to a return operation of the multi-edge tool does not involve cutting.

FIG. 10B is a diagram showing an example illustrating an operation of the tool path regeneration unit 115 when the operation next to the return operation of the multi-edge tool does not involve cutting.

As shown in FIG. 10B, for example, tool paths C1 to C4 are calculated by the tool path generation unit 111, and the tool paths C1 to C4 are paths along which the multi-edge tool 40 passes in order. The tool paths C1 and C4 are paths along which the multi-edge tool 40 cuts the workpiece W, and the tool paths C2 and C3 are paths along which the multi-edge tool 40 is fast forwarded from an end point (point P) of the tool path C1 to a start point of the tool path C4.

For example, when the edge switching determination unit 113 determines that edge switching is necessary at the point P at which the tool path C1 is switched to the tool path C2, the edge switching path generation unit 114 calculates edge switching paths including a retract direction, a retract amount, a rotation direction, a rotation amount, and a return path of the multi-edge tool 40, as in the case of FIGS. 8A to 8D.

As in the case of FIG. 10A, the tool path regeneration unit 115 connects (a) a retract operation (escape operation) and (b) a rotation operation at the end point of the tool path C1. However, since the tool path C2 is a path next to the tool path C1 and does not involve cutting, the tool path regeneration unit 115 does not connect (c) a return operation as a reverse operation of (a) the retract operation (escape operation), and may combine an end point of (c) the return operation so as to overlap with an end point of the tool path C2. In the case of FIG. 10B, since the tool path C3 is also a path after the next to the tool path C1 and does not involve cutting along with the tool path C2, the tool path regeneration unit 115 may combine the end point of (c) the return operation so as to overlap with an end point of the tool path C3.

Thus, the numerical controller 10 can speed up the edge switching operation and shorten a cycle time.

Further, the tool path regeneration unit 115 may cause an edge rotation operation to overlap with the retract operation (escape operation) or the return operation in which the end points of the tool paths C2 and C3 are switched.

The interpolation processing unit 120 performs interpolation processing on the tool path received from the NC command decoding unit 110, and calculates a command position and a command speed.

The tool offset unit 130 calculates a tool offset amount using the selected position offset amount and tool nose radius compensation amount of the multi-edge tool 40 and the geometrical information of the multi-edge tool 40 generated by the tool geometry storage/generation unit 150 which will be described below.

The pulse distribution unit 140 outputs a pulse for each axis movement of the calculated tool offset to each servo motor (not shown) included in the machine tool 20.

The tool geometry storage/generation unit 150 serves as a tool information generation unit to generate geometrical information of the multi-edge tool 40, based on the tool information data 210 retained in the tool information memory 200.

<NC Command Execution Processing of Numerical Controller 10>

Next, a description will be given with respect to an example of the operation related to the NC command execution processing of the numerical controller 10 in a case of performing edge switching of the multi-edge tool in the machining program for machining using the edges of the multi-edge tool, based on the designated conditions.

Figure 11:
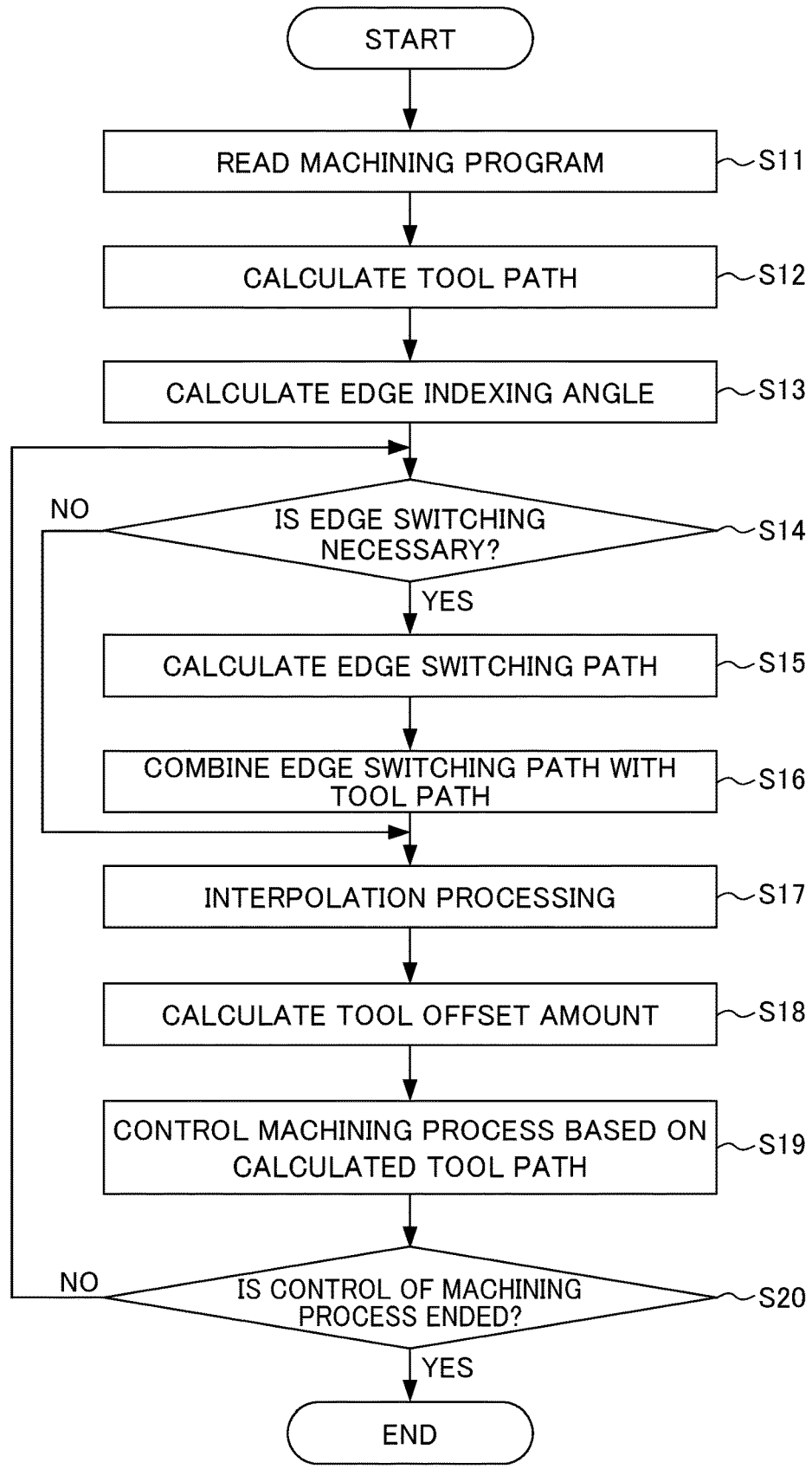
FIG. 11 is a flowchart illustrating an example of NC command execution processing of the numerical controller.

FIG. 11 is a flowchart illustrating an example of NC command execution processing of the numerical controller 10. The flow shown herein is a processing flow related to NC command execution processing for performing edge switching of the multi-edge tool when an edge for a forward path and an edge for a return path are designated by edge numbers.

In Step S11, the NC command decoding unit 110 reads blocks of the machining program 30.

In Step S12, the tool path generation unit 111 pre-reads a plurality of blocks included in the machining program 30 read in Step S11, and calculates tool paths of the numbers (1) to (14) of the multi-edge tool 40 shown in FIGS. 6A and 6B from NC commands in the plurality of pre-read blocks.

In Step S13, the edge direction determination unit 112 calculates an edge indexing angle at which the multi-edge tool and the workpiece W do not interfere with each other, based on the tool path calculated in Step S12 and the geometrical information of the multi-edge tool 40 acquired by the tool geometry storage/generation unit 150.

In Step S14, the edge switching determination unit 113 determines, based on the tool path calculated by the tool path generation unit 111, whether the edge switching of the multi-edge tool 40 is necessary. When it is determined that the edge switching of the multi-edge tool 40 is necessary, the process proceeds to Step S15. On the other hand, when it is determined that the edge switching of the multi-edge tool 40 is not necessary, the process proceeds to Step S17.

In Step S15, the edge switching path generation unit 114 calculates an edge switching path including the retract path for the edge switching of the multi-edge tool 40, the rotation direction and the rotation amount of the multi-edge tool, and the return path along which the retract path is returned to the tool path.

In Step S16, the tool path regeneration unit 115 combines the edge switching path calculated in Step S15 with the tool path calculated in Step S12.

In Step S17, the interpolation processing unit 120 performs interpolation processing on the tool path received from the NC command decoding unit 110, and calculates a command position and a command speed.

In Step S18, the tool offset unit 130 calculates the tool offset amount using the selected position offset amount (for example, turning tool) and tool nose radius compensation amount of the multi-edge tool 40 and the tool geometry information of the multi-edge tool 40 acquired by the tool geometry storage/generation unit 150.

In Step S19, the numerical controller 10 controls the machining process based on the calculated tool path (including the edge switching operation command when the edge switching operation command is calculated).

In Step S20, it is determined whether the control of the machining process based on all the tool paths ends. When the control of the machining process based on all the tool paths does not end, the process proceeds to Step S14.

As described above, when the edge for the forward path and the edge for the return path are designated by the edge numbers, the numerical controller 10 can automatically perform the edge switching of the multi-edge tool 40.

By using the simplified program command "Gxx", it is possible to reduce the burden on the user, and to avoid the interference between the multi-edge tool 40 and the workpiece W due to an error in the edge switching operation command.

Further, the numerical controller 10 can make the cutting load constant on the forward path and the return path by switching the edges of the multi-edge tool 40 between the forward path direction and the return path direction, and can make the cutting distance uniform between the edges. In addition, the numerical controller 10 can shorten the cycle time by speeding up the edge switching operation.

The embodiment has been described above, but the numerical controller 10 is not limited to the above-described embodiment, and includes, for example, modifications and improvements within a range that can achieve the purpose.

Modification Example

In the above-described embodiment, the numerical controller 10 is the device different from the machine tool 20, but is not limited thereto. For example, the numerical controller 10 may be included in the machine tool 20.

Each of the functions included in the numerical controller 10 of the embodiment can be realized by hardware, software, or a combination thereof. Here, being realized by software means that such a function by the software is realized when a computer reads and executes a program.

The program may be stored and supplied to a computer using various types of non-transitory computer readable media. The non-transitory computer readable media include various types of tangible storage media. Examples of the non-transitory computer readable media include a magnetic recording medium (for example, a flexible disk, a magnetic tape, and a hard disk drive), a magneto-optic recording medium (for example, a magneto-optic disk), a CD-ROM (Read Only Memory), a CD-R, a CD-R/W, and a semiconductor memory (for example, a mask ROM, a PROM (Programmable ROM), an EPROM (Erasable PROM), a flash ROM, and a RAM). Further, these programs may be supplied to computers using various types of transitory computer readable media. Examples of the transitory computer readable media include an electrical signal, an optical signal, and an electromagnetic wave. The transitory computer readable media can supply programs to a computer through a wired communication line, for example, electric wires and optical fibers, or a wireless communication line.

In addition, the steps of describing the program to be recorded on the recording medium include not only a process performed sequentially in a time-series manner but also a process executed in parallel or individually without being necessarily processed in a time-series manner.

In other words, the numerical controller and the control method of the present disclosure can take various embodiments having the following configurations.

(1) The numerical controller 10 of the present disclosure provides a numerical controller that controls a machine tool for performing turning of a workpiece W using a multi-edge tool 40 for turning, the numerical controller including: an NC command decoding unit 110 configured to decode a command of a machining program 30; a tool information memory 200 configured to retain tool information and edge information of the multi-edge tool 40; and a tool geometry storage/generation unit 150 configured to generate geometrical information of the multi-edge tool 40 based on the tool information and the edge information retained in the tool information memory 200, the NC command decoding unit 110 including a tool path generation unit 111 configured to calculate a tool path of the multi-edge tool 40 from the command of the machining program 30, an edge switching determination unit 113 configured to determine whether edge switching of the multi-edge tool 40 is necessary, an edge switching path generation unit 114 configured to, when the edge switching determination unit 113 determines that the edge switching is necessary, calculate an edge switching path including a retract path for the edge switching, a rotation direction and a rotation amount of the multi-edge tool 40, and a return path along which the retract path is returned to the tool path, and a tool path regeneration unit 115 configured to combine the edge switching path with the tool path.

According to the numerical controller 10, it is possible to automatically perform the edge switching of the multi-edge tool 40.

(2) In the numerical controller 10 according to (1) described above, the edge switching determination unit 113 may determine whether the edge switching is necessary, based on at least one selected from a signal input from an external device of the numerical controller, a physical quantity applied to a drive axis included in the machine tool 20, and the tool path.

Thus, the numerical controller 10 can perform the edge switching at good timing for cutting.

(3) In the numerical controller 10 according to (1) or (2) described above, the edge switching path generation unit 114 may calculate the edge switching path based on at least one selected from the command of the machining program 30 and the tool path.

Thus, the numerical controller 10 can calculate the optimum edge switching path.

(4) In the numerical controller 10 according to any one of (1) to (3) described above, the edge switching path calculated by the edge switching path generation unit 114 may not cause interfere between the multi-edge tool 40 and the workpiece W in a middle of the edge switching path.

Thus, the numerical controller 10 can give priority to safety at the time of edge switching.

(5) In the numerical controller 10 according to any one of (1) to (4) described above, the edge switching path generation unit 114 may calculate the retract path, the rotation direction and the rotation amount of the multi-edge tool 40, and the return path so as to shorten at least one selected from a time required for the edge switching and a path required for the edge switching.

Thus, the numerical controller 10 can speed up the edge switching operation and can shorten the cycle time.

(6) The control method of the present disclosure provides a control method for a machine tool 20 to be implemented by a computer, the machine tool being for performing turning of a workpiece W using a multi-edge tool 40 for turning, the control method including: an NC command decoding step of decoding a command of a machining program 30; and a tool information generation step of generating geometrical information of the multi-edge tool 40 based on tool information and edge information of the multi-edge tool retained in a tool information memory 200, the NC command decoding step including a tool path generation step of calculating a tool path of the multi-edge tool 40 from the command of the machining program 30, an edge switching determination step of determining whether edge switching of the multi-edge tool 40 is necessary, an edge switching path generation step, when the edge switching is determined to be necessary, of calculating an edge switching path including a retract path for the edge switching, a rotation direction and a rotation amount of the multi-edge tool, and a return path along which the retract path is returned to the tool path, and a tool path regeneration step of combining the edge switching path with the tool path.

According to the control method, the same effect as (1) can be obtained.

EXPLANATION OF REFERENCE NUMERALS

10 numerical controller
100 control unit
110 NC command decoding unit
111 tool path generation unit
112 edge direction determination unit
113 edge switching determination unit
114 edge switching path generation unit
115 tool path regeneration unit
120 interpolation processing unit
130 tool offset unit
140 pulse distribution unit
150 tool geometry storage/generation unit
200 tool information memory
210 tool information data
20 machine tool
30 machining program
40 multi-edge tool

The invention claimed is:

1. A numerical controller (NC) that controls a machine tool, the numerical controller comprising:
an NC command decoding unit configured to decode a command of a machining program;
a storage unit configured to retain tool information and edge information of a multi-edge tool; and
a tool information generation unit configured to generate geometrical information of the multi-edge tool based on the tool information and the edge information retained in the storage unit,
the NC command decoding unit including
a tool path generation unit configured to calculate a tool path of the multi-edge tool from the command of the machining program,
an edge switching determination unit configured to determine whether edge switching of the multi-edge tool is necessary,
an edge switching path generation unit configured to, when the edge switching determination unit determines that the edge switching is necessary, calculate an edge switching path including a retract path for the edge switching, a rotation direction and a rotation amount of the multi-edge tool, and a return path along which the retract path is returned to the tool path, and a tool path regeneration unit configured to combine the edge switching path with the tool path to control the machine tool to perform turning of a workpiece using the multi-edge tool for turning.

2. The numerical controller according to claim 1, wherein the edge switching determination unit determines whether the edge switching is necessary, based on at least one of a signal input from an external device of the numerical controller, a physical quantity applied to a drive axis included in the machine tool, and the tool path.

3. The numerical controller according to claim 1, wherein the edge switching path generation unit calculates the edge switching path based on at least one of the command of the machining program and the tool path.

4. The numerical controller according to any one of claims 1 to 3, wherein the edge switching path calculated by the edge switching path generation unit does not cause interfere between the multi-edge tool and the workpiece in a middle of the edge switching path.

5. The numerical controller according to claim 1, wherein the edge switching path generation unit calculates the retract path, the rotation direction and the rotation amount of the multi-edge tool, and the return path so as to shorten at least one of a time required for the edge switching and a path required for the edge switching.

6. A control method for a machine tool to be implemented by a computer, the control method comprising:
   a numerical controller (NC) command decoding step of decoding a command of a machining program; and
   a tool information generation step of generating geometrical information of the multi-edge tool based on tool information and edge information of the multi-edge tool retained in a storage unit,
   the NC command decoding step including
   a tool path generation step of calculating a tool path of the multi-edge tool from the command of the machining program,
   an edge switching determination step of determining that edge switching of the multi-edge tool is necessary,
   an edge switching path generation step, in response to the edge switching being necessary, of calculating an edge switching path including a retract path for the edge switching, a rotation direction and a rotation amount of the multi-edge tool, and a return path along which the retract path is returned to the tool path, and
   a tool path regeneration step of combining the edge switching path with the tool path to control the machine tool to perform turning of a workpiece using the multi-edge tool for turning.

* * * * *